(12) United States Patent
Daum et al.

(10) Patent No.: US 6,254,253 B1
(45) Date of Patent: Jul. 3, 2001

(54) DEFLECTABLE LASER SOURCE HAVING MOVABLE PIEZU ELEMENTS FOR PROJECTING IMAGES

(75) Inventors: Wolfgang Daum, Schwerin; Wieland Hingst, Hamburg, both of (DE)

(73) Assignee: Viewpoint Technology, Inc., Dublin, OH (US)

( * ) Notice: Subject to any disclaimer, the term of this patent is extended or adjusted under 35 U.S.C. 154(b) by 0 days.

(21) Appl. No.: 09/236,037

(22) Filed: Jan. 22, 1999

(30) Foreign Application Priority Data

Jan. 22, 1998 (DE) .............................. 198 02 516
Jul. 14, 1998 (DE) .............................. 198 32 817
Jul. 16, 1998 (DE) .............................. 198 31 644

(51) Int. Cl.⁷ .................................................. F21K 27/00
(52) U.S. Cl. .......................... 362/259; 362/271; 362/272; 362/286; 362/276; 362/551; 362/419; 362/428
(58) Field of Search .................................... 362/259, 271, 362/272, 286, 276, 551, 419, 428

(56) References Cited

U.S. PATENT DOCUMENTS 5,576,901 * 11/1996 Hanchett .............................. 359/877

* cited by examiner

Primary Examiner—Sandra O'Shea
Assistant Examiner—Ronald E. DelGizzi
(74) Attorney, Agent, or Firm—Standley & Gilcrest LLP

(57) ABSTRACT

The invention is a device for deflecting a light beam. A system includes a memory unit for memorizing the data of a symbol to be read into the system, a laser beam deflection unit, a laser, and a power source. All parts are integrated in a housing which can be held by the human hand. The light beam is deflected using piezo-responsive elements.

24 Claims, 9 Drawing Sheets

DEFLECTABLE LASER SOURCE HAVING MOVABLE PIEZU ELEMENTS FOR PROJECTING IMAGES

FIELD OF THE INVENTION

The invention relates to a laser device for projecting signs, letters, numbers and other graphical representations onto a presentation wall.

BACKGROUND OF THE INVENTION

Various laser deflection devices are currently known. These deflection devices tend to be expensive, large, and very voluminous. For many applications, however, deflection devices as small as possible are required. One application of such a small deflection device is a hand-held laser pointer being able not only to direct a simple point of light onto a board, but also to display any chosen graphical representation. Thus, a speaker could project a company logo or any other sign onto the board during a presentation. The problem is how to design the smallest possible deflection device which, in addition to being able to project both a graphic and a point, is battery-operated and uses the lowest possible amount of energy.

SUMMARY OF THE INVENTION

Generally, the present invention relates to miniaturized light deflector systems. In particular, the invention is related to a deflector system where the light source itself is deflected. In one embodiment, the invention is a laser projection device that has a first piezo element, attached at a first end to a base and a second end movable in a first direction. A second piezo element is attached at a first end to the first piezo element and has a second end movable in a second direction. A light source is attached to the second piezo element.

In another embodiment, the invention is a device for deviating a laser beam that has first and second piezo elements attached at respective first ends to a base at independent first and second fixed points. A focusing element is attached to a movable, second end of the first piezo element, and a light source is to a movable, second end of the second piezo element, and oriented to direct a light beam towards the focusing element. Movement of one or more of the second ends of the piezo elements results in projection of the light beam within a preselected projection angular volume.

The above summary of the present invention is not intended to describe each illustrated embodiment or any implementation of the invention. The figures and detailed description that follow more particularly exemplify these embodiments.

BRIEF DESCRIPTION OF THE DRAWINGS

The invention may be more completely understood in consideration of the following detailed description of various embodiments of the invention in combination with the accompanying drawings, in which.

DETAILED DESCRIPTION

The invention proposes the use of a laser deviation device based on piezo-responsive bodies, for example thin piezoceramic plates, or so-called laminas or bimorph elements). Unlike known devices, where a fixed light source directs its beam onto moving mirrors, prisms or audio-visual converters, the light source itself is deviated in this invention.

The laser beam deviation device is designed in such way that the laser diode is mounted onto a piezo body moving in one direction, the latter itself being mounted onto another piezo body moving in another direction. This tends to cause the device to be vulnerable to mechanical oscillations such as concussions affecting the device from out side. Overswinging and uncontrolled conditions owing to resonance frequencies of the piezo elements may occur. Oscillation couplings between both piezo elements may occur if the elements are not mounted orthogonally to one another. The present invention is directed to a solution of this oscillation problem and to find techniques to permit the system to operate at high frequency.

Another advantage of the present invention is that it memorizes the symbol to be depicted with the deflectable laser in to the device.

In principle, the solution lies in the use of piezoceramic laminates, alternatively referred to as bimorph elements, for shifting the position of a small laser, such as a laser diode. The laser diode is placed on a first piezoceramic element, lying, for example, oriented in an x-y-direction, and moving in a z-direction upon activation by an applied voltage. This first piezoceramic element is then mounted onto a second piezoceramic element oriented, for example, in the x-z-level, and being movable in the y-direction by upon activation by an applied voltage. The laser beam is transmitted through an optical element such as a lens, to control the position and the divergence or convergence of the beam.

Figure 1:
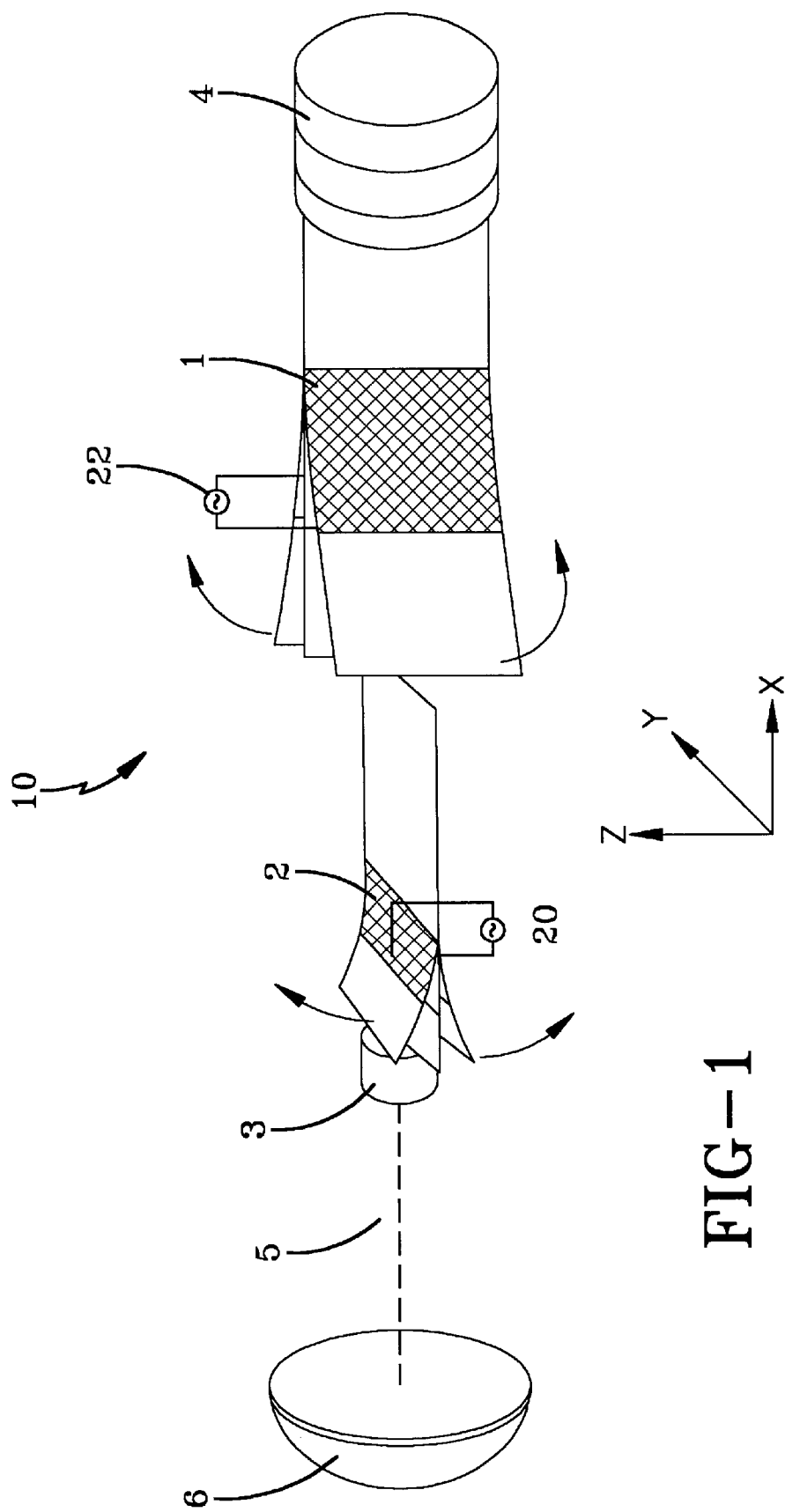
FIG. 1 illustrates an embodiment of the deflection device for the laser beam, according to the present invention.

FIG. 1 shows a schematic of one particular embodiment of the system. A laser diode 3 is mounted onto a first piezo element 2 lying, for example, oriented in an x-y plane, and deflectable in the z-direction by an applied voltage from voltage source 20. The first piezo element 2 is mounted onto a second piezo element 1 oriented in the x-z-direction and deflectable in the y-direction by an applied voltage from voltage source 22. The first piezo element 1 is mounted onto a base point 4. The laser beam 5 emitted by the laser diode 3 is guided through an optical element 6 such as a lens or combination of lenses, which can widen or reduce the width of laser beam 5 as desired. The laser 3 can be mounted onto the front, the upper or bottom side of the first piezo element 2. Any known connection technique, such as soldering, gluing, fusing, or bonding may be used for mounting the laser 3 onto the first piezo element 2, as well as for connecting the first and second piezo elements 2 and 1.

The coordinate axes s, y and z are used only for descriptive purposes, and may also be chosen or stated otherwise.

The illustrated system is suitable for integration into a hand-held laser pointer, or other hand-held device, such as a hand-held computer or other electronic information system.

Figure 2:
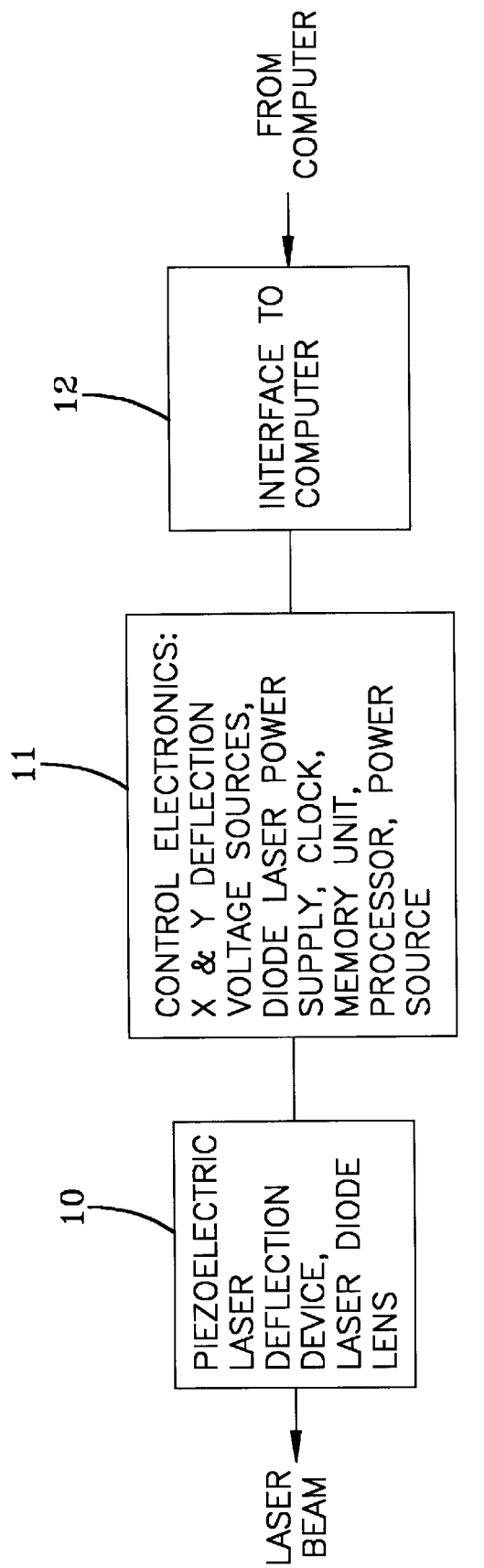
FIG. 2 shows an embodiment of an electronic control circuit system for the deflection device.

FIG. 2 shows a schematic of the electrical system for driving the laser beam deflection device. The piezoelectric laser deflection device 10 includes the piezo deflecting elements 1 and 2, the light source 3 and the optical elements 6, and receives a triggering voltage from an electronic control circuit that generates the y-z- deflection voltage 11. This control circuit 11 also contains the power source for the laser diode 3. The instructions for deflecting the laser beam may be read into the control circuit 11, and stored as memory, through an interface to an external computer 12. The control circuit 11 includes a clock generator, a memory unit, an exit stage, and a power source. The interface to the external computer 12 includes the circuit for the data condition protocol, the cable connection or the wireless transmission unit.

Figure 10:
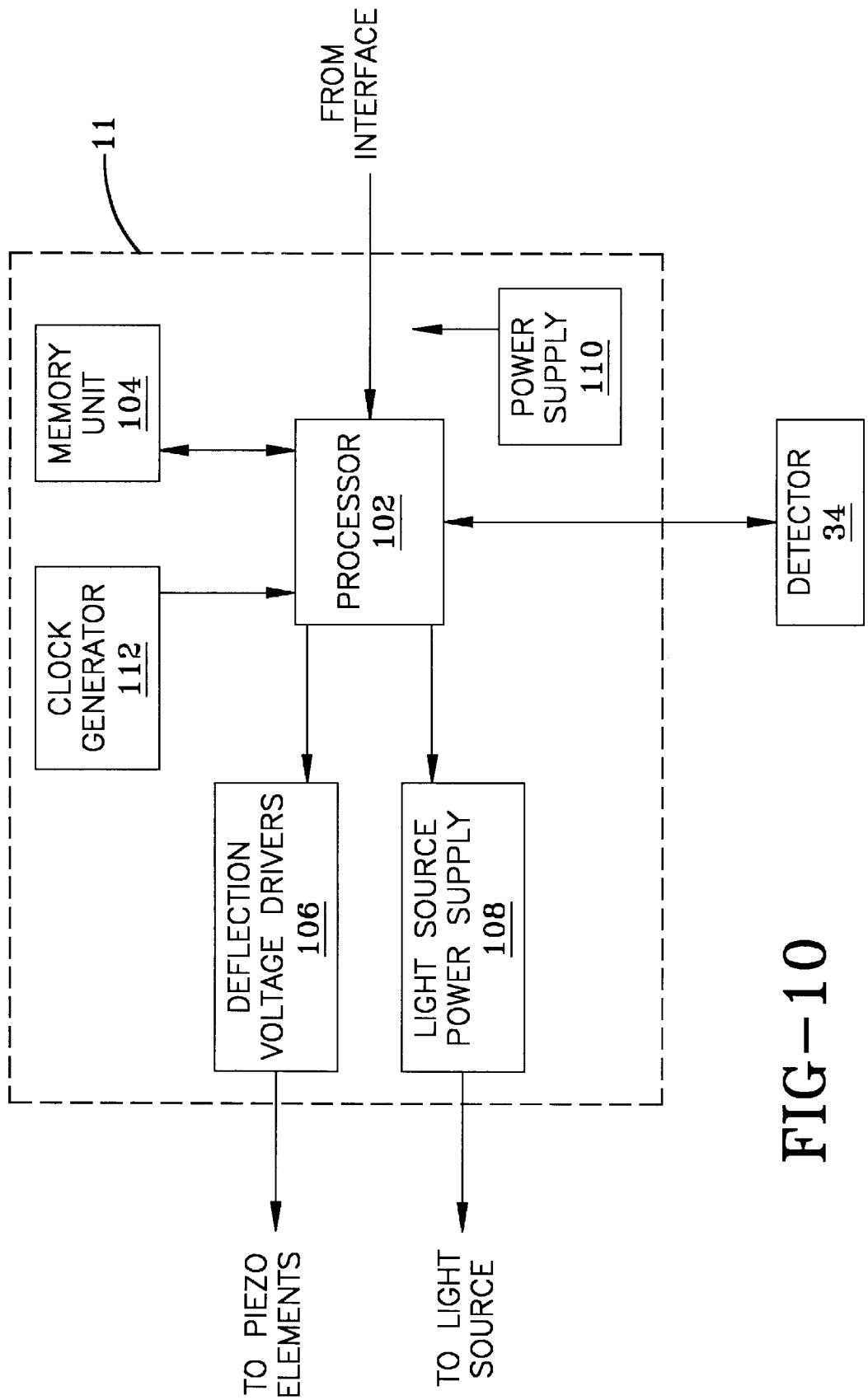
FIG. 10 illustrates an embodiment of a control circuit.

One particular embodiment of the control circuit 11 is illustrated in FIG. 10. The control circuit has a microprocessor unit 102 coupled to a memory unit 104. The processor 102 is also coupled to deflection voltage drivers 106 that apply the deflection voltage signals to the piezo elements. The deflection voltage drivers 106 may include one or more DC to DC converters to produce the voltage needed to operate the piezo elements from a low voltage battery, for example to produce ±40 V from a 4.5 V battery. The processor 102 is also coupled to a light source power supply, 108, for example a current supply for a laser diode. By controlling the light source power supply 108, the processor may control the optical power transmitted in the laser beam 5. For example, the processor may be used to control the power emitted by the unit 10 to be below prescribed safety limits. A power supply 110, for example a battery, supplies electrical power to all the components of the control circuit 11. A clock generator 112 may also be coupled to the processor 102 to transmit timing pulses thereto.

Figure 3:
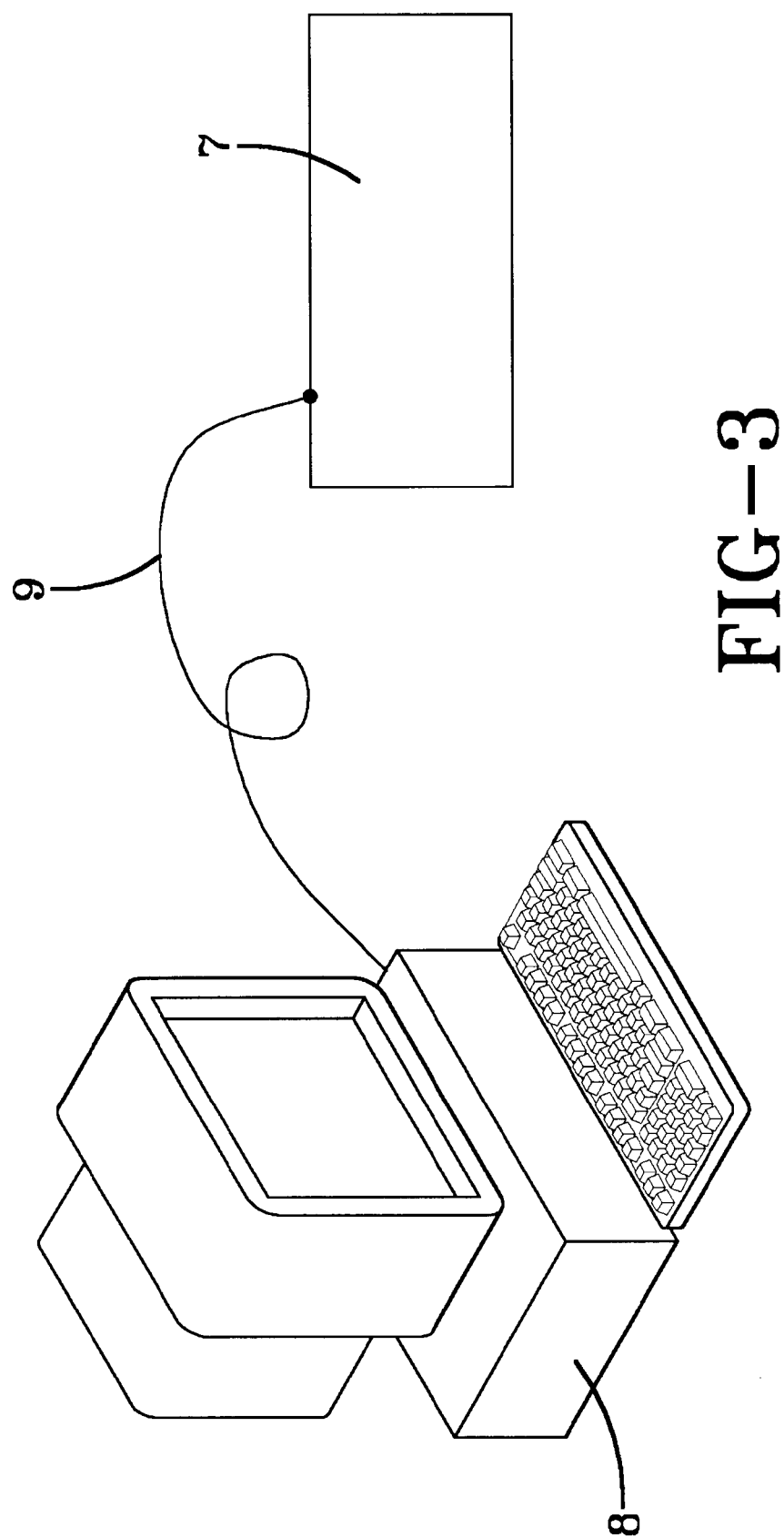
FIG. 3 shows a total view of an embodiment of the deflection device.

FIG. 3 shows the total system. The laser deflection apparatus 7 includes the deflection device 10 shown in FIG. 1, the laser diode 3, the electronic control circuit 11 for generating the deflection voltage, and the interface 12 to the external computer. The instructions for forming the deflection image may be created at the external computer 8 and transmitted via the cable 9 into the laser deflection apparatus 7 through the interface. The laser deflection apparatus 7 may be operated as a battery-powered, portable device or in a stationary mode.

The user may, for example, create a graphic image to be shown by the apparatus 7 using suitable software at the computer 8, and transfer the instructions for forming the graphic image for storage in the memory module of the apparatus 7. The laser 3 may then be operated independently from the computer 8. At any time, the laser 3 may be switched on and the graphic image instructions reloaded to a control processor from the memory. The control circuit then deflect the piezo elements according to the instructions, and so the laser diode projects the desired graphical image onto a screen. It may be possible to memorize instructions for several graphical images, or a series of graphical images, such as symbols, letters, and numbers in the memory unit. Any available memory device may be used as a memory unit. Instead of storing instructions in the memory unit, it may be possible to store some other representative data for the desired graphical image, and then to convert the representative data to instructions for translating the piezo elements. The conversion may be performed by the processor.

Such a device may be used to display time. For example, assume that the memory unit stores instructions for projecting each of the ten digits 0, 1, 2, 3, 4, 5, 6, 7, 8, and 9, as well as a colon symbol, ":". The control electronics may be programmed to select the instructions appropriate to display the current time, as detected by the clock generator. For example, if the current time is half past eleven, the control circuit 11 would select, in turn for projection, a "1", a "1", a ":", a "3" and a "0", to show "11:30". It will be understood that each symbol may be projected with a small lateral translation so that the symbols line up on the screen next to each other, and are not overwritten on top of each other.

Alternatively to the excursion of the laser diode, such a hand-held laser beam deflection device could also a fixed laser, the beam of which could be deflected by mobile mirrors.

For the device shown in FIGS. 1–3, typical values are:

Deflection voltage: from –40 to +40 V

Current input: up to 20 mA

Deflection: up to 10 cm within 3 m projection length

Piezo element: 0.5 mm×4 mm×8 mm

These values are presented for illustration only and are not to be understood to limit the invention in any way.

It is very important to reduce the mass of the deflection system so as to reduce the system energy required to move the light source 3, and also to increase the response bandwidth for the piezo elements. Three different approaches to reducing the system mass are discussed, which may be implemented independently or in conjunction with others.

Figure 4:
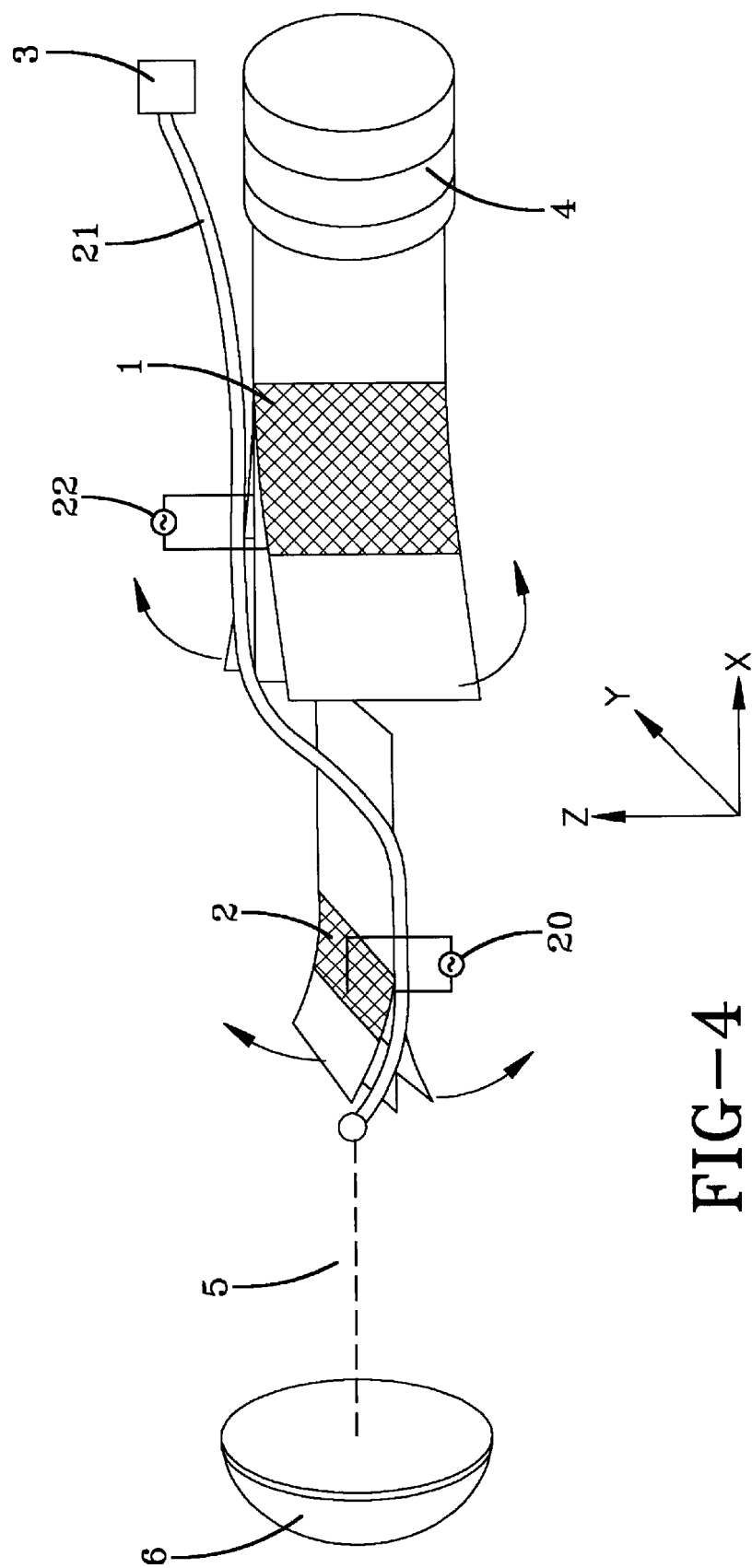
FIG. 4 illustrates an embodiment of a deflection device using a flexible fiber-optic light guide, according to the present invention.

First, the laser diode 3 (with or without housing) is not placed on the piezoceramic itself, but at another location. For example, the laser diode 43 may be mounted on the base point 4 (not illustrated). Light is guided from the laser diode 3 to the first piezo element by a fiber-optic light guide 21 (glass or plastic, foil or fiber) as illustrated in FIG. 4. The light emerges from the end of the fiber optic light-guide 21 which is located on the first piezo element. The light propagates towards the lens system 46. The removal of the laser diode, along with the concurrent electrical and mechanical connections from the tip of the first piezo element 2, reduces the mass of the system to be moved.

Figure 5:
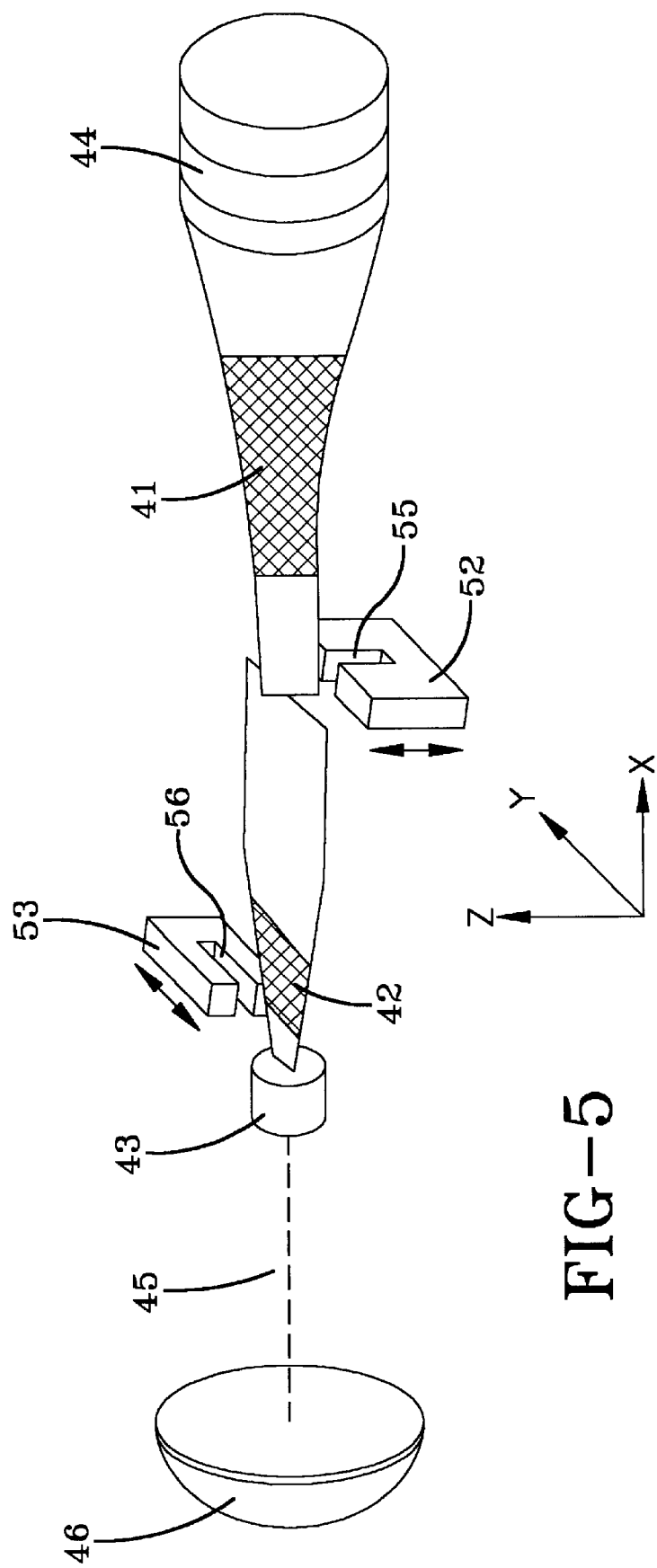
FIG. 5 illustrates an embodiment of a deflection device incorporating tapered piezo elements.

Second, the piezo elements 41 and 42 are designed in such way that their widths diminish in size from the end of their fixed points forward, as illustrated in FIG. 5. Thus, a light source 43 is mounted at the tapered end of the first piezo element 42. The first piezo element 42 is mounted on the second piezo element 41 which, in turn, is mounted on the base point 44. Light from the light source 43 is directed through the lens system 46. The tapering of the piezo elements results in a reduction of the mass of the system to be moved.

Figure 6:
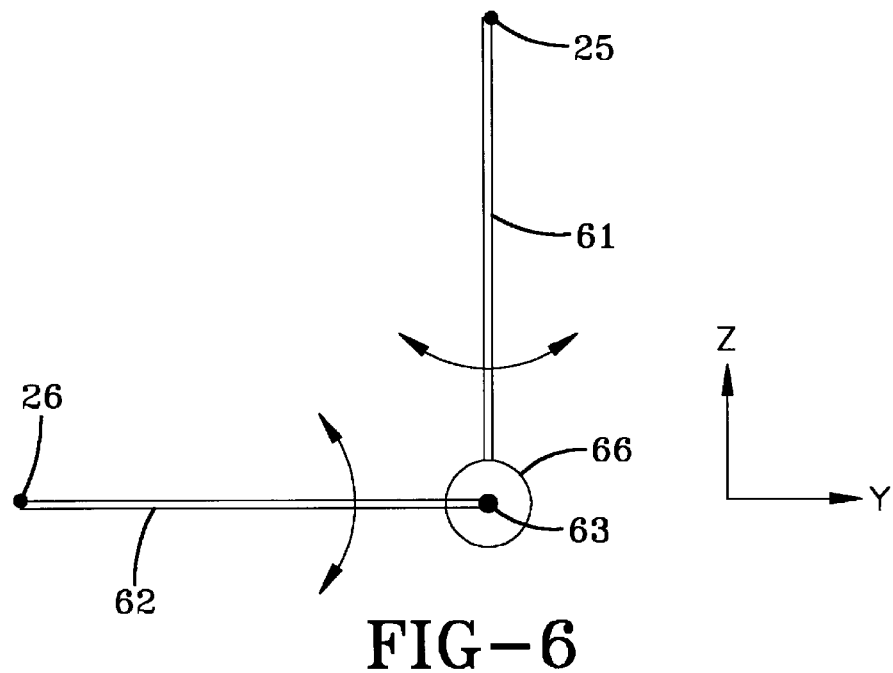
FIGS. 6 and 7 illustrate an embodiment of a deflection device incorporating two independent piezo elements.
Figure 7:
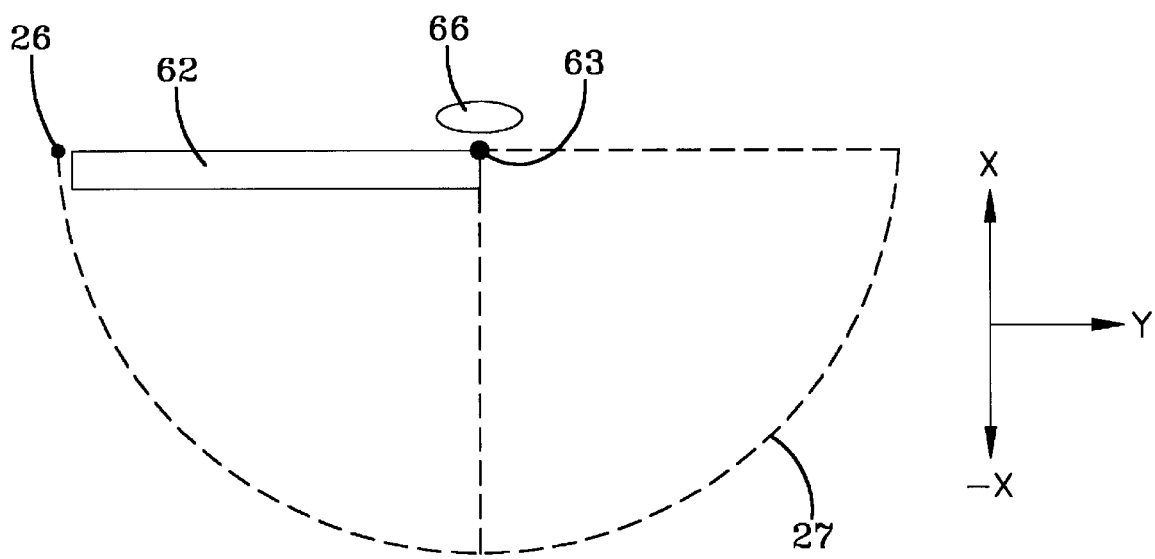

Third, the system may be designed so that each piezo element is fixed at its own fixed point as illustrated in FIG. 6. The first piezo element 6, light source 63, the laser diode, or the outlet of the fiber-optic light guide, at its movable end. The second piezo element 62 bears the lens 66 at its movable end. The piezo elements 61 and 62 are fixed so that the light source 63 always radiates through the lens 66 and that the laser beam may be deviated in one or two dimensions as a result of the relative movement between the light source 63 and the lens 66, the laser beam thus being able to reach or scan any point of a defined, limited area with a corresponding excursion of the piezo elements 61 and 62. FIG. 6 shows the arrangement in a horizontal projection with a view from the x-axis. The first piezo element 61 is firmly fixed onto point 25 and moves in the y-direction of the y-z plane. The second piezo element 42 is fixed onto fixed point 26 and moves in the z-direction of the y-z plane. In this way, the second piezo element 42 can also be placed in the x-y plane as shown in FIG. 7, its fixed point 25 then lying at some point on the semicircle 27 and the light source 63, the laser diode or the fiber end lying in the optical axis of the lens 66 when the system is non-operative, i.e., when no voltage is applied to the piezo elements 61 and 62.

For all the embodiments suggested herein, the piezo elements need not move orthogonally to one another; other excursion correlations may be employed. The graphic to be projected may be a pixel or a vector graphic.

FIG. 5 also shows locking devices 52 and 53 that may be moved into place (in the direction shown by the arrows) to prevent the piezo elements 41 and 42 from moving. The locking devices 52 and 53 are useful for preventing movement of the piezo elements 41 and 42 when the deflection unit is not being used, and may help, for example, to prevent the piezo elements 41 and 42 from breaking if the unit is dropped. The locking devices 52 and 53 may have any suitable shape: the devices illustrated have respective slots 55 and 56 that receive the elements 41 and 42. The locking devices 52 and 53 may be operated in different ways, including manually, or under control of the control circuit 11. The locking devices 52 and 53 may also be formed from springs or rubber sheets. The locking devices 52 and 53 may be formed from a soft material, such as rubber or plastic, to protect the piezo material.

Figure 8:
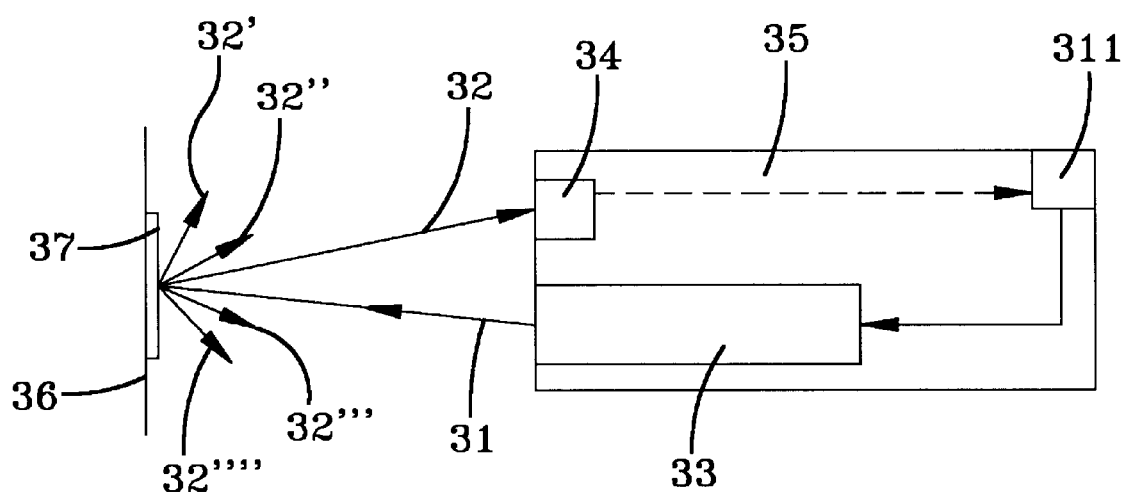
FIG. 8 illustrates the deflection device operating in a "read" mode, according to an embodiment of the invention.
Figure 9:
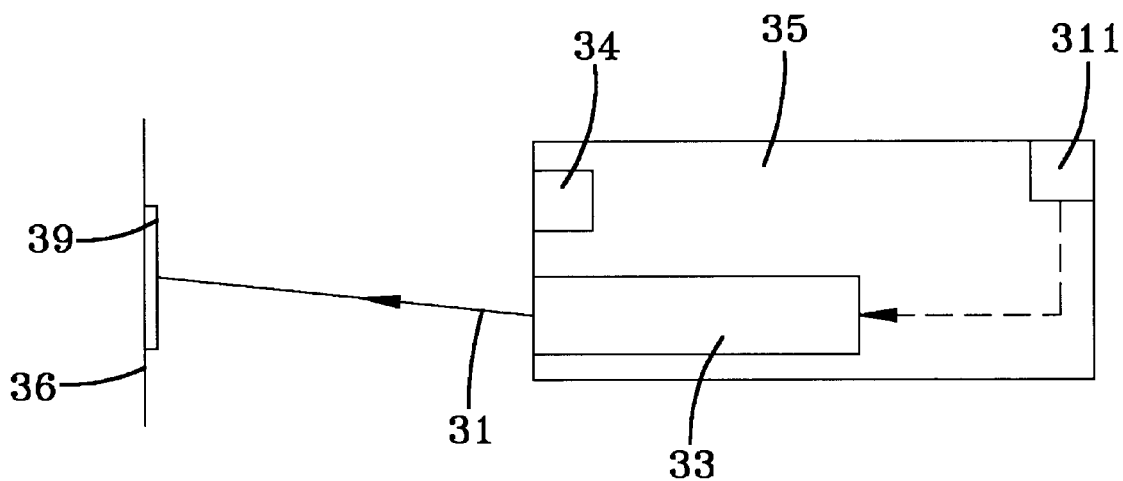
FIG. 9 illustrates the deflection device operating in a "write" mode, according to an embodiment of the invention.

An embodiment for a laser scanning device 35 that can "learn" instructions for projecting a particular symbol is illustrated in FIGS. 8 and 9. The device 35 includes a scanning unit 33 that projects a deflectable laser beam 31. The device 35 also includes a photodetector 34 which has a detection angular volume that overlaps the projection angular volume of the scanning unit 33. The photodetector 34 is coupled to a processor on the control circuit 311 to transmit detection information. The scanning unit 33 operates under control from the control circuit 311.

In one mode of operation, the scanning unit 33 scans a raster pattern on a wall or screen 36. An symbol image 37 is positioned on the wall 36, for example a piece of paper with writing thereon. It is advantageous for the symbol 37 to be provided in a color that contrasts with the background. As the laser beam 31 is scanned, the beam 31 passes over the symbol on the wall 36. The detector 34 detects light reflected 32 from the wall 36. The reflected light 32 may be specularly reflected or diffusely reflected. Diffusely reflected light is shown as 32', 32", 32''' and 32''''. The controller 311 receives a detection signal from the detector 34. The detection signal includes high and low levels, depending on whether the instantaneously reflected beam 32 is reflected off the symbol 37 or the background. The detection signal may then be associated with the various control parameters related to the instantaneous values of x and y deflection. The instantaneous detection level x and y deflection levels may be stored in the memory unit 104 to provide a stored "map" of the symbol 37 on the wall.

Figure 11:
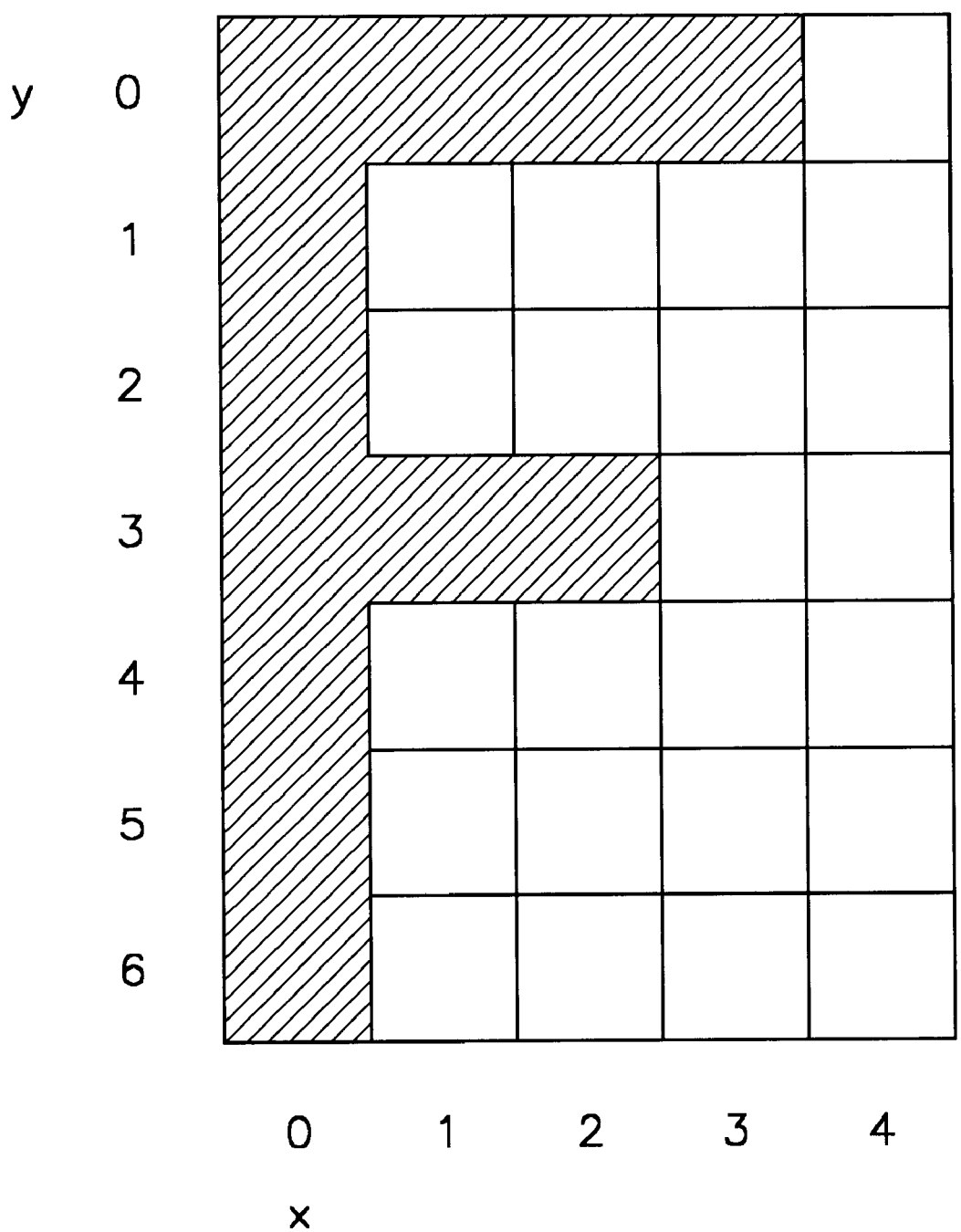
FIG. 11 illustrates a symbol in a pixel array.

This may be further understood with reference to FIG. 11, which shows the letter "F" portrayed on a 7×5 pixel grid. Here, for the purposes of explanation only, we assume that the scanning unit 33 scans a row along the x-direction, and then flies back to start another row displaced downwards by one pixel height in the y-direction. We use that convention that the x and y values are presented as (x,y). Therefore, the scanning unit scans the pixels in the order (0,0), (1,0), (2,0), (3,0), (4,0), (0,1) . . . . and so on. Once the scan reaches the pixel (4,6), it returns to the top at pixel (0,0). As the laser beam 31 is scanned, the detector 34 detects the level of the reflected light. Therefore, for each pixel, there is an associated value of light reflection. The memory unit 104 stores the value of light reflection R, along with the piezo voltage values, or equivalent, required to address that particular pixel with the laser beam 31. For simplicity, we assume that R can take on only one of two values, 0 or 1, meaning high reflection and low reflection. It should be appreciated that various filtering and statistical techniques may be used to relate a particular detected signal level with an expected level of reflectance.

The memory unit may store the information as a series of triplets, $(V_x, V_y, R_{x,y})$, where $V_x$ and $V_y$ denote the voltages, or equivalent, required to address the pixel (x,y) and $R_{x,y}$ denoted the value of reflectance from pixel (x,y). There is a triplet value for each pixel. For the particular example illustrated in FIG. 11, the only triplets which have a value of $R_{x,y}=0$ (pixel is dark) are: (0,0,0), (0,1,0), (0,2,0), (0,3,0), (0,4,0), (0,5,0), (0,6,0), (1,0,0), (2,0,0), (3,0,0), (1,3,0) and (2,3,0). All the other triplets have values of $R_{x,y}= 1$ (pixel is light).

On playback, as illustrated in FIG. 9, the control circuit 311 the scanning unit 33 to scan the laser beam in a similar raster patter as was used to "read" the symbol 37. The pixel reflectance information is used to control the intensity produced by the laser. For example, where the reflectance for a particular pixel was found to be low, indicating a dark square in FIG. 11, the laser may be turned to high intensity, and turned to a low intensity when writing to a pixel previously read to have a high reflectance. This way, the scanning unit 33 will project a symbol 39, for example the letter "F", onto the wall 36.

Owing to its small weight and volume, the device is portable by hand and may be hand-held. The device is also able to read the signs or words to be projected from a memory unit and transfer them into a corresponding diode deviation unit and piezo bimorph element drive. The outlet of a fiber-optic light guide or of a respective laser diode array can also be placed at the position of the diode or diodes instead of a diode or a diode array.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A laser projection device, comprising:
   a base;
   a first piezo element, attached at a first end to the base and having a second end movable in a first direction;
   a second piezo element, attached at a first end to the first piezo element and having a second end movable in a second direction; and
   a light source attached to the second piezo element.

2. A laser projection device as recited in claim 1, wherein the light source includes a laser diode mounted on the second piezo element.

3. A laser projection device as recited in claim 1, wherein the light source includes an output end of an optical fiber mounted on the second piezo element, an input end of the optical fiber optically coupled to a laser.

4. A laser projection device as recited in claim 1, wherein the light source is mounted proximate the second end of the second piezo element.

5. A laser projection device as recited in claim 1, further comprising a locking device movable to reduce motion of one of the piezo elements.

6. A laser projection device as recited in claim 1, further comprising a voltage generator operatively coupled to the piezo elements for applying respective, independent controlling voltage signals thereto.

7. A laser projection device as recited in claim 6, further comprising a controller operatively coupled to the voltage generator so as to control application of controlling voltage signals to the piezo elements.

8. A laser projection device as recited in claim 7, wherein the controller is configured to control the device to project symbols related to a current time of day.

9. A laser projection device as recited in claim 7, further comprising a memory unit to store symbol data related to a symbol to be projected by the projection device, the memory unit operatively coupled to the controller to transmit the symbol data thereto, and a power source operatively coupled to the light source, the controller, and the voltage generator, wherein the projection device is contained within a housing adapted to be carried by a human hand.

10. A laser projection device as recited in claim 1, further comprising an optical element disposed at a position to divergence of a light beam transmitted from the light source.

11. A laser projection device as recited in claim 1, wherein the piezo elements taper from their respective first ends towards their respective second ends.

12. A laser projection device as recited in claim 1, further comprising a locking device to lock the piezo elements in place.

13. A laser projection device as recited in claim 1, further comprising a controller operatively coupled to the light source to control an amplitude of light generated by the light source and to the piezo elements to control deflection of the piezo elements.

14. A laser projection device as recited in claim 13, further comprising a light detector operatively coupled to the controller and having a detection angular volume overlapping a projection angular volume, wherein the controller includes a memory unit, the controller being adapted to store piezo control information and detector information so as to record levels of light detected by the detector for different piezo control values.

15. A device for deviating a laser beam, comprising:
   a base;
   first and second piezo elements attached at respective first ends to the base at independent first and second fixed points;
   a focusing element attached to a movable, second end of the first piezo element;
   a light source attached to a movable, second end of the second piezo element, and oriented to direct a light beam towards the focusing element;
   wherein movement of one or more of the second ends of the piezo elements results in projection of the light beam within a preselected projection angular volume.

16. A device as recited in claim 15, wherein the light source is a laser diode mounted on the second end of the second piezo element.

17. A device as recited in claim 15, wherein the light source is an output end of an optical fiber mounted on the second end of the second piezo element, an input end of the optical fiber being optically coupled to a laser light source.

18. A device as recited in claim 15, wherein the piezo elements taper from their respective first ends towards their respective second ends.

19. A device as recited in claim 15, further comprising a locking device movable to reduce motion of one of the piezo elements.

20. A device as recited in claim 15, further comprising a controller operatively coupled to the light source to control an amplitude of light generated by the light source and to the piezo elements to control deflection of the piezo elements.

21. A device as recited in claim 20, wherein the controller includes a memory unit operatively coupled to a control processor to transmit symbol projection information thereto.

22. A device as recited in claim 20, further comprising a light detector operatively coupled to the controller and having a detection angular volume that overlaps with the projection angular volume, wherein the controller includes a memory unit, the controller being adapted to store piezo control information and detector information so as to record levels of light detected by the detector for different piezo control values.

23. A laser projection device, comprising:
   light emitting means for emitting light;
   first deflection means, the light emitting means attached at a first end of the first deflection means, for deflecting the light emitting means;
   second deflection means, the first deflecting means attached to a first end of the second deflecting means, for deflecting the first deflection means, a first end of the second deflecting means being attached a base.

24. A laser projection device, comprising:
   light emitting means for emitting a light beam;
   first deflection means, the light emitting means attached at a first end of the first deflection means, for deflecting the light emitting means, a second end of the first deflection means being attached to a base;
   light focusing means for focusing light;
   second deflection means, the light focusing means attached at a first end of the second deflection means, for deflecting the light focusing means, a second end of the second deflection means being attached to the base;
   wherein the light emitting means and the light focusing means are aligned so that relative motion between the light emitting means and the light focusing means results in projection of the light beam within a preselected projection angular volume.

* * * * *